(12) United States Patent
Tanji

(10) Patent No.: US 11,809,994 B2
(45) Date of Patent: Nov. 7, 2023

(54) INFORMATION PROCESSING APPARATUS, INFORMATION PROCESSING METHOD, AND NON-TRANSITORY COMPUTER-READABLE STORAGE MEDIUM

(71) Applicant: CANON KABUSHIKI KAISHA, Tokyo (JP)

(72) Inventor: Koichi Tanji, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 367 days.

(21) Appl. No.: 16/984,448

(22) Filed: Aug. 4, 2020

(65) Prior Publication Data
US 2021/0049411 A1 Feb. 18, 2021

(30) Foreign Application Priority Data
Aug. 15, 2019 (JP) .................. 2019-149156

(51) Int. Cl.
*G06N 3/084* (2023.01)
*G06T 7/11* (2017.01)
(Continued)

(52) U.S. Cl.
CPC ........... *G06N 3/084* (2013.01); *G06F 18/214* (2023.01); *G06F 18/217* (2023.01); *G06F 18/24* (2023.01);
(Continued)

(58) Field of Classification Search
CPC .. G06K 9/6256; G06K 9/6254; G06K 9/6262; G06K 9/6267; G06K 9/627; G06N 3/02; G06N 3/0454; G06N 3/084; G06N 3/045; G06T 7/11; G06T 7/12; G06T 2207/20081; G06T 2207/20084; G06T 2207/20104; G06V 10/235; G06V 10/44; G06V 10/764; G06V 10/774; G06V 10/776; G06V 10/82; G06V 10/945;
(Continued)

(56) References Cited

U.S. PATENT DOCUMENTS

2011/0224542 A1* 9/2011 Mittal ................ G06T 7/143
  600/425
2018/0181790 A1* 6/2018 Li .................... G06V 10/757
(Continued)

OTHER PUBLICATIONS

Muramatsu "Improvement on recognition of major arteries and veins on retinal fundus images by template matching with vessel models" Medical Image Information Academic Conference. 2013: pp. 63-69. vol. 30, No. 3. English abstract provided.
(Continued)

*Primary Examiner* — Amandeep Saini
*Assistant Examiner* — Daniella M. DiGuglielmo
(74) *Attorney, Agent, or Firm* — ROSSI, KIMMS & McDOWELL LLP

(57) ABSTRACT

An information processing apparatus comprises a generating unit configured to generate supervised data relating to a topological invariant based on a topological property relating to supervised data corresponding to input data, and a training unit configured to perform, based on a geometric property relating to an output from a classifier to which the input data is input and the supervised data generated by the generating unit, training of the classifier.

12 Claims, 11 Drawing Sheets

(51) Int. Cl.
*G06T 7/12* (2017.01)
*G06N 3/02* (2006.01)
*G06V 10/44* (2022.01)
*G06F 18/214* (2023.01)
*G06F 18/24* (2023.01)
*G06F 18/21* (2023.01)
*G06V 10/764* (2022.01)
*G06V 10/774* (2022.01)
*G06V 10/776* (2022.01)
*G06V 10/82* (2022.01)
*G06V 10/94* (2022.01)
*G06N 3/045* (2023.01)
*G06F 18/2413* (2023.01)
*G06V 10/22* (2022.01)
*G06F 18/40* (2023.01)

(52) U.S. Cl.
CPC ............... *G06F 18/41* (2023.01); *G06N 3/02* (2013.01); *G06T 7/11* (2017.01); *G06T 7/12* (2017.01); *G06V 10/235* (2022.01); *G06V 10/44* (2022.01); *G06V 10/764* (2022.01); *G06V 10/774* (2022.01); *G06V 10/776* (2022.01); *G06V 10/82* (2022.01); *G06V 10/945* (2022.01); *G06F 18/2413* (2023.01); *G06N 3/045* (2023.01); *G06T 2207/20081* (2013.01); *G06T 2207/20084* (2013.01); *G06T 2207/20104* (2013.01)

(58) Field of Classification Search
CPC ...... G06F 18/214; G06F 18/217; G06F 18/24; G06F 18/41; G06F 18/2413
See application file for complete search history.

(56) References Cited

U.S. PATENT DOCUMENTS

2018/0276847 A1* 9/2018 Last .................. G06V 10/52
2020/0242353 A1* 7/2020 Zhang ................ G06N 3/0454

OTHER PUBLICATIONS

Umeda "Time Series Classification via Topological Data Analysis" Artificial Intelligence Academic Conference. 2017: pp. 1-12. vol. 32, No. 3.

* cited by examiner

SET OF ALL BASIC
TRAINING DATA

TOPOLOGICAL
INVARIANT
ERROR EVALUATION
BY CLASSIFIER
FOR EVALUATION

SET OF BASIC TRAINING DATA
FOR DIFFICULT IMAGE TRAINING ness of the obtained result suffers. Also, in the case where the previously-described classifier is used, what is reflected in the training is local information such as the error with respect to the local supervised data, and it is not of a global form that a specific pattern has.
INFORMATION PROCESSING APPARATUS, INFORMATION PROCESSING METHOD, AND NON-TRANSITORY COMPUTER-READABLE STORAGE MEDIUM

BACKGROUND OF THE INVENTION

Field of the Invention

The present invention relates to a technique for performing training by using a topological property of a detected region.

Description of the Related Art

Conventionally, specific patterns have been extracted by computational processing (morphology computation or the like) such as filtering from an input signal. In such a morphology computation, in a case where an input signal is an image, for example, output is obtained by causing a structural element of a specific size such as 3×3 pixels act on original data. Also, to identify a specific pattern from an input signal, identification of a specific pattern by using a classifier after having generated the classifier by using training data has been carried out. In classifier training, in a case of using a hierarchical network for training, for example, an error with respect to provided correct answer data (hereinafter, described as supervised data or GT (Ground Truth)) is back-propagated in a hierarchical network to update weighting coefficients. Results obtained in the extraction of the specific pattern using the previously-described morphology computation depend on a local range of the acting structural element, and if the size of the structural element is increased, the range over which it acts increases, but there is a problem in that the resolution of the obtained result suffers. Also, in the case where the previously-described classifier is used, what is reflected in the training is local information such as the error with respect to the local supervised data, and it is not of a global form that a specific pattern has.

To handle such problems, several proposals have been made thus far. For example, a method (C. Muramatsu, et al. "Improvement on recognition of major arteries and veins on retinal fundus images by template matching with vessel models", medical image information academic conference, Vol. 30, No. 3, 63-69 (2013)) that, by performing matching with respect to a specific pattern form prepared in advance, known as template matching, extracts a specific form is known. Also, a method (Y. Umeda "Time Series Classification via Topological Data Analysis", artificial intelligence academic conference, Vol. 32, No. 3, 1-12 (2017)) of capturing global features of data at a stage at which data is inputted into the classifier, by applying TDA (Topological Data Analysis) focusing on topological properties of the data to time-series data mapped to a specific space is known.

However, in the previously-described method of using template matching, the effects are limited to the pattern of a template prepared in advance, and there is a problem in that it is not possible to use it as a general-purpose method. Also, in the previously-described method using TDA for training, it is only disclosed that topological properties of time-series data are used as feature amounts, and there was a problem in that the topological properties of data are not envisioned to be used for training of various targets in a wide range of forms.

SUMMARY OF THE INVENTION

The present invention provides a technique that uses topological properties of a detected region for training of a classifier.

According to the first aspect of the present invention, there is provided an information processing apparatus comprising: a generating unit configured to generate supervised data relating to a topological invariant based on a topological property relating to supervised data corresponding to input data; and a training unit configured to perform, based on a geometric property relating to an output from a classifier to which the input data is input and the supervised data generated by the generating unit, training of the classifier.

According to the second aspect of the present invention, there is provided an information processing method, the method comprising: generating supervised data relating to a topological invariant based on a topological property relating to supervised data corresponding to input data; and performing training, based on a geometric property relating to an output from a classifier to which the input data is input and the generated supervised data, of the classifier.

According to the third aspect of the present invention, there is provided a non-transitory computer-readable storage medium storing a computer program for causing a computer to function as a generating unit configured to generate supervised data relating to a topological invariant based on a topological property relating to supervised data corresponding to input data; and a training unit configured to perform, based on a geometric property relating to an output from a classifier to which the input data is input and the supervised data generated by the generating unit, training of the classifier.

Further features of the present invention will become apparent from the following description of exemplary embodiments (with reference to the attached drawings).

DESCRIPTION OF THE EMBODIMENTS

Figure 1:
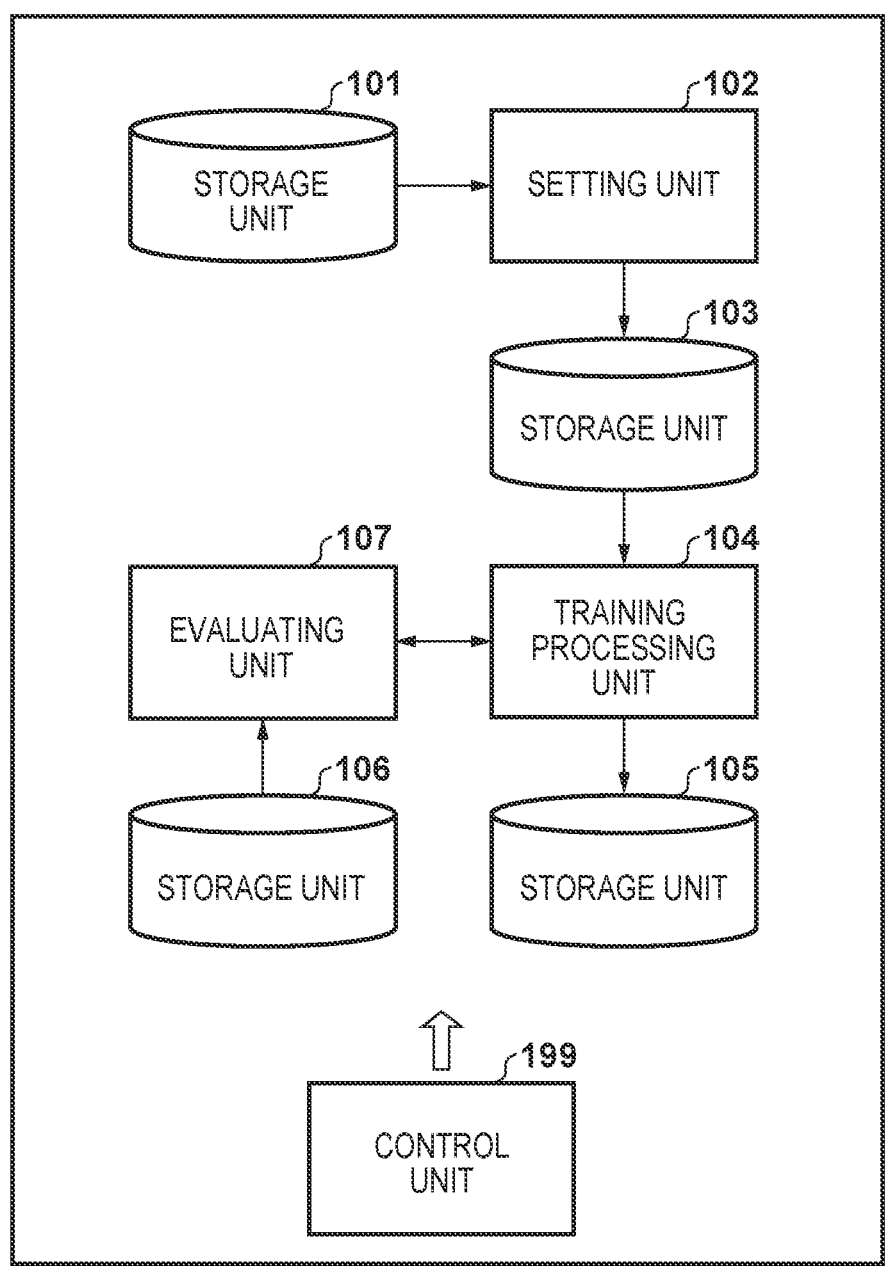
FIG. 1 is a block diagram that illustrates an example of a functional configuration of an information processing apparatus.

Hereinafter, embodiments will be described in detail with reference to the attached drawings. Note, the following embodiments are not intended to limit the scope of the claimed invention. Multiple features are described in the embodiments, but limitation is not made an invention that requires all such features, and multiple such features may be combined as appropriate. Furthermore, in the attached drawings, the same reference numerals are given to the same or similar configurations, and redundant description thereof is omitted.

It is an object of the present invention to provide a technique in which it is possible to obtain a more desirable result by training a topological property of a detected region in combination with a conventional method. In a case where a topological property of the detected region can be used, it can be applied to any method or target.

First Embodiment

Firstly, description is given regarding an example of a functional configuration of an information processing apparatus according to the present embodiment using the block diagram of FIG. 1. Note, the configuration illustrated in FIG. 1 is merely one example of a configuration capable of realizing the training process described hereinafter, and the functional configuration of the information processing apparatus is not limited to the configuration illustrated in FIG. 1 if a similar objective can be achieved.

A storage unit 101 stores basic training data. The basic training data is original training data that is not subjected to any processing, deformation, or additional interpretation. The basic training data includes input data and supervised data which is data that is desirable as output data to be output from the classifier when the input data is inputted to the classifier.

A setting unit 102 generates supervised data, which relates to a topological invariant, based on a topological property of partial data in the supervised data included in the basic training data. Also, the setting unit 102 stores, to a storage unit 103 topological invariant training data which is training data that includes basic training data and "supervised data relating to a topological invariant" generated by the setting unit 102.

Figure 3A:
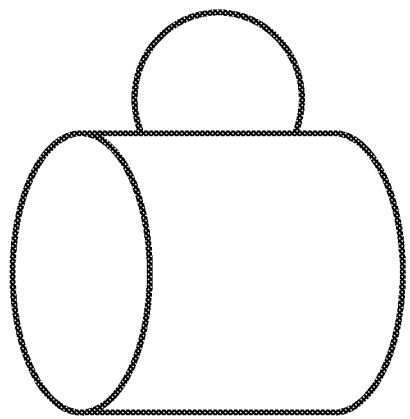
FIG. 3A and FIG. 3B are schematic diagrams of a geometric phase (topology) concept.
Figure 3B:
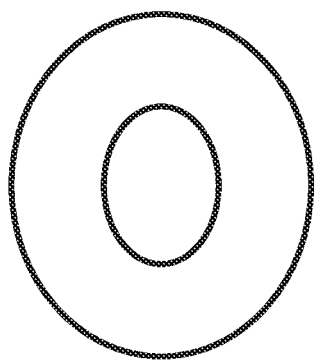
Figure 4A:
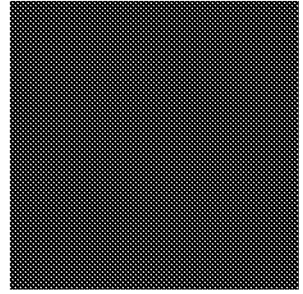
FIG. 4A to FIG. 4C are schematic diagrams of a topological invariant concept.
Figure 4B:
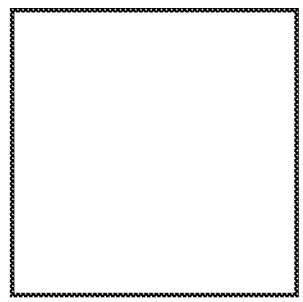
Figure 4C:
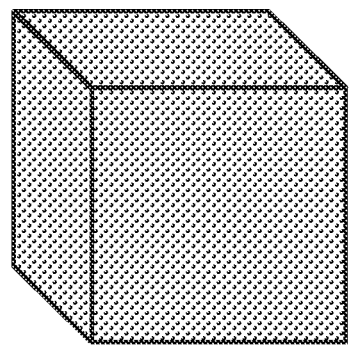

Here, description regarding a topological property is given using FIGS. 3A and 3B. FIG. 3A illustrates a contour of a coffee cup as an example and FIG. 3B illustrates a contour of a donut as an example. Although the contour of the coffee cup of FIG. 3A and the contour of the donut of FIG. 3B are different in shape, when focusing on the number of holes within the contours, there is one hole in the handle part in FIG. 3A and there is one hole in the donut in FIG. 3B, and they are both the same. In this way, even if the original shape is continuously transformed (is expanded/contracted and bent but is not cut), a property that is kept unchanged is called the topological property, and the amount that is kept unchanged is called the topological invariant. FIG. 4A to FIG. 4C schematically illustrate representative topological invariants. FIG. 4A schematically illustrates a concept of connected components, FIG. 4B schematically illustrates a concept of a hole in a two-dimensional system, and FIG. 4C schematically illustrates a concept of a cavity in a three-dimensional system. Each number remains unchanged in a continuous deformation.

Returning to FIG. 1, a training processing unit 104 performs training processing on a classifier by using topological invariant training data stored in the storage unit 103. Also, when training processing of the classifier completes, the training processing unit 104 stores the result of the training processing to a storage unit 105.

A storage unit 106 stores test data which is used for evaluating the classifier on which training has been completed by the training processing unit 104. The basic training data as described above may be used as the test data, for example.

An evaluating unit 107 uses the test data stored in the storage unit 106 and performs evaluation of the classifier on which training was completed by the training processing unit 104. For example, in a case where the basic training data as described above is used as the test data, the evaluating unit 107 obtains a difference (error) between the output of the classifier for the input data included in the basic training data and the supervised data included in the basic training data as an evaluation result. Also, the evaluating unit 107 notifies the user of the obtained evaluation result by a notification method such as a display output or an audio output. A control unit 199 controls operation of each functional unit of the above described information processing apparatus.

Figure 2:
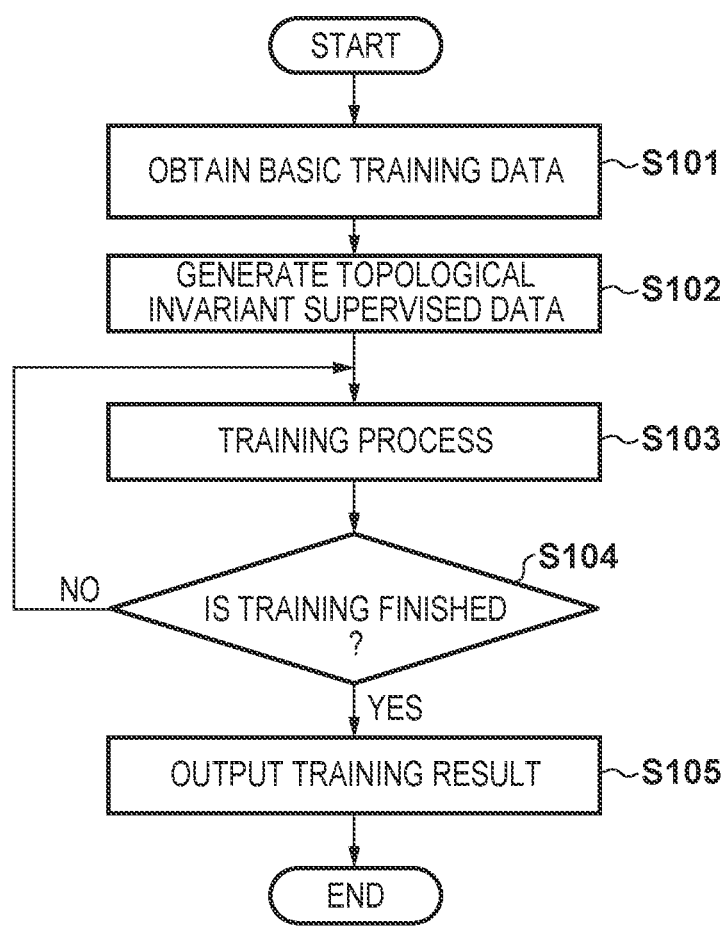
FIG. 2 is a flowchart of a training process for a classifier according to the information processing apparatus.

Next, the classifier training process by the information processing apparatus according to the present embodiment will be described in accordance to the flowchart in FIG. 2. In step S101, the setting unit 102 obtains basic training data stored in the storage unit 101. Note that the source of the basic training data is not limited to the storage unit 101; for example, the basic training data may be obtained from an external apparatus via a network.

In step S102, the setting unit 102 sets a region, as a region of interest, for obtaining a topological invariant which represents a topological property, in relation to the supervised data included the basic training data obtained in step S101, and obtains the topological invariant in the region of interest as topological invariant supervised data.

From here, what kind of topological invariant supervised data is generated depends on the properties of the basic training data (what size, shape, or topological invariant can be used to extract the topological invariant of the basic training data most effectively). Hereinafter, an example is described in which the present invention is applied in a case where contour extraction (extraction of a contour portion of an object included in an image to be input) is performed.

Also, the setting unit 102 stores the topological invariant training data, which is training data including the basic training data and the topological invariant supervised data generated by the setting unit 102, in the storage unit 103.

Figure 5:
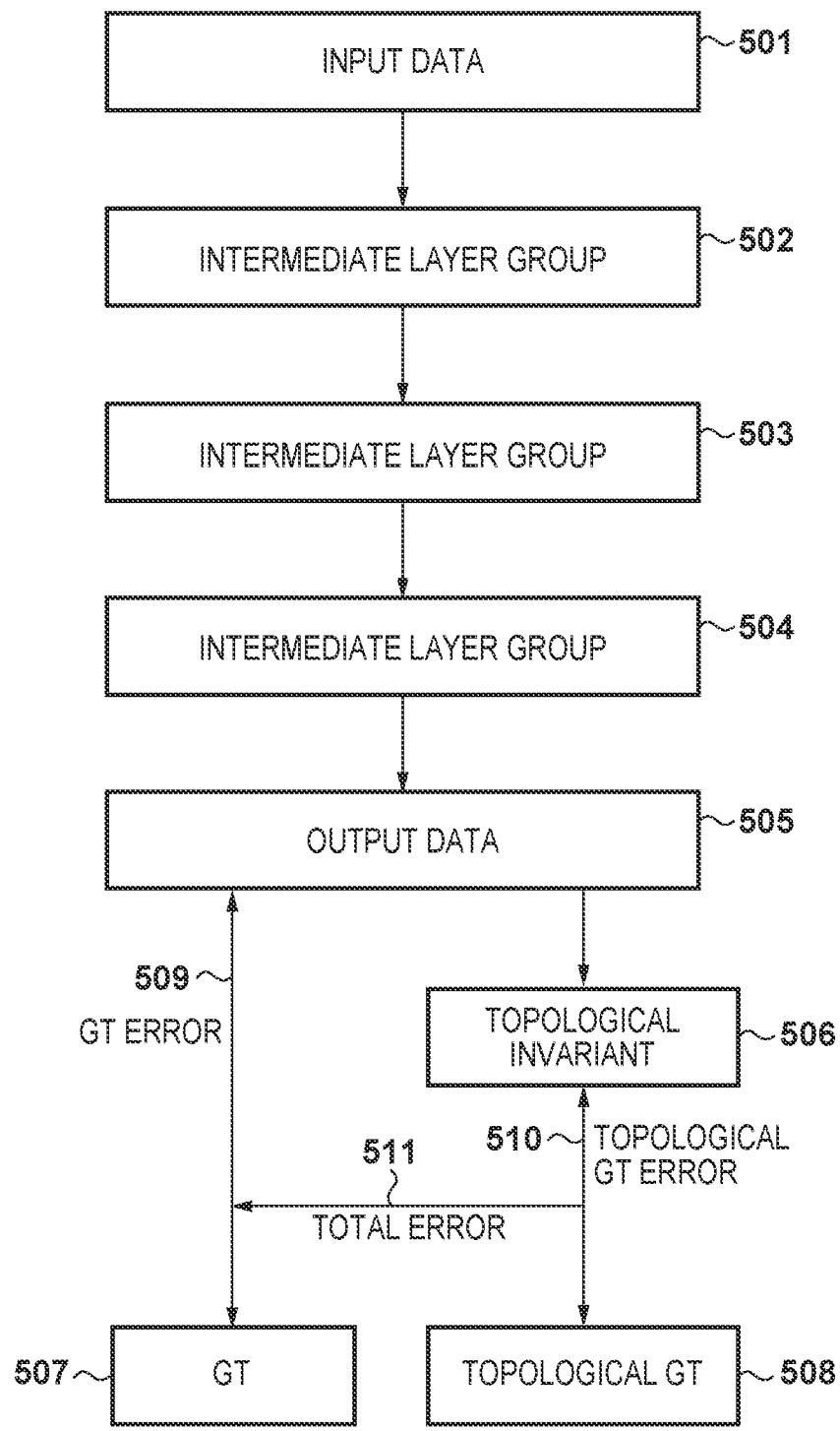
FIG. 5 is a schematic drawing of a hierarchical network of a topological invariant used for training.

In step S103, the training processing unit 104 performs the process of training the classifier using the topological invariant training data stored in the storage unit 103 in step S102. The operation of the training processing unit 104 when a hierarchical neural network is used as a classifier is described with reference to FIG. 5. The hierarchical neural network of FIG. 5 is configured by intermediate layer groups 502 to 504 (each intermediate layer group includes, for example, a plurality of convolution layers, a pooling layer, and a fully connected layer). For example, the intermediate layer group 502 is composed of two convolutional layers, the intermediate layer group 503 is composed of two convolutional layers followed by one pooling layer, and the intermediate layer group 504 is composed of two convolutional layers followed by one pooling layer, similar to the intermediate layer group 503. Hereinafter, a case where the training processing unit 104 performs a process of training a hierarchical neural network having such a configuration will be described.

The training processing unit 104 inputs input data 501 included in the basic training data to the intermediate layer group 502 to cause the hierarchical neural network to operate. Thus, the intermediate layer group 502 processes the input data 501, the intermediate layer group 503 processes the results of processing by the intermediate layer group 502, and the intermediate layer group 504 processes the results of processing by the intermediate layer group 503.

Then, the training processing unit 104 obtains a difference (error) between output data 505 (output distribution from the hierarchical neural network to which the input data 501 was inputted) as the processing result by the intermediate layer group 504 and a GT 507 (supervised data of a contour expected to be extracted from the output data 505), which is the supervised data included in the topological invariant training data as a GT error 509. For the GT error 509, for example, when the label value of the GT 507 is a binary value of 0 and 1, a cross entropy $L_{GT}$ of the following equation (1) may be used.

[EQUATION 1]

$$L_{GT} = -\beta \sum_{j \in Y_+} \log(y_j) - (1-\beta) \sum_{j \in Y_-} \log(1-y_j) \quad \text{Equation (1)}$$

In Equation (1), $y_j$ represents the output value of the j-th pixel in the image represented by the output data 505. $Y_+$ represents a positive region (label value: 1) in the GT 507 used for evaluation, and $Y_-$ represents a negative region (label value: 0) in the GT 507 used for evaluation. $\Sigma$ means the sum of all pixels in the image represented by the output data 505. Furthermore, $\beta$ is a coefficient that corrects an unbalance of a ratio between positive and negative in the GT 507, and is defined, for example, as a ratio of the number of pixels where the GT 507 is negative, relative to the total number of pixels. Note, the value of $\beta$ may be calculated and set for each GT 507, or may be set to an average value for all of the GT 507.

The training processing unit 104 obtains a topological invariant 506 (the number of holes) in a region corresponding to the region of interest in the output data 505. Then, the training processing unit 104 obtains, as a topological GT error 510, the difference (error) between the topological invariant 506 and a topological GT 508 which is the topological invariant supervised data (supervised data of a topological invariant expected to be output as the topological invariant 506) in the region of interest. For example, as the topological GT error 510, a square error between the topological invariant 506 and the topological GT 508 is obtained for each region of interest. For the topological GT error 510 corresponding to the k-th region of interest out of the plurality of regions of interest, for example, $l_{\_GT\_k}$ of the following Equation (2) may be used.

[EQUATION 2]

$$l_{t\_GT\_k} = (t_k - t\_GT_k)^2 \quad \text{Equation (2)}$$

In Equation (2), $t_k$ represents the topological invariant 506 (the number of holes) corresponding to the k-th region of interest, and $t\_GT_k$ represents the topological GT 508 set for the k-th region of interest.

Then, the training processing unit 104 obtains an overall error based on the GT error 509 obtained using the Equation (1) and the topological GT error 510 obtained using the Equation (2). For example, the training processing unit 104 obtains a total error 511 expressed by the product of the GT error 509 and the topological GT error 510 as a total error based on the GT error 509 obtained using the Equation (1) and the topological GT error 510 obtained using the Equation (2). As the total error 511, for example, $L_{total}$ of the following Equation (3) may be used.

[EQUATION 3]

$$L_{total} = \\ -\beta \sum_{j \in Y_+} \log(y_j) \times l_{t,GT,k} - (1-\beta) \sum_{j \in Y_-} \log(1-y_j) \times l_{t,GT,k} \quad \text{Equation (3)}$$

In Equation (3), the topological GT error 510 of the region of interest k corresponding to the region in which each pixel exists is obtained by taking the sum of all the pixels multiplied by the GT error 509 evaluated in each pixel.

The training processing unit 104 performs the training process of the hierarchical neural network to minimize the total error 511, thereby obtaining a weighting coefficient in the hierarchical neural network.

Figure 6A:
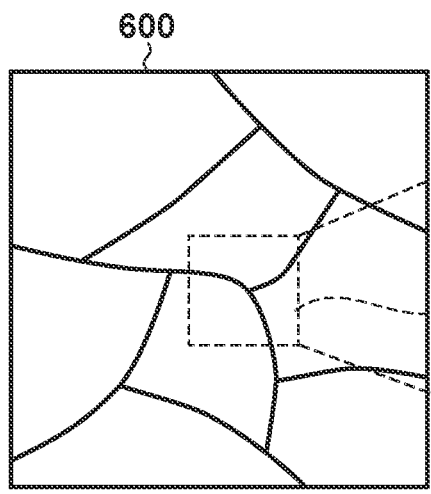
FIG. 6A to FIG. 6C are schematic diagrams of a process for setting a region of interest.
Figure 6B:
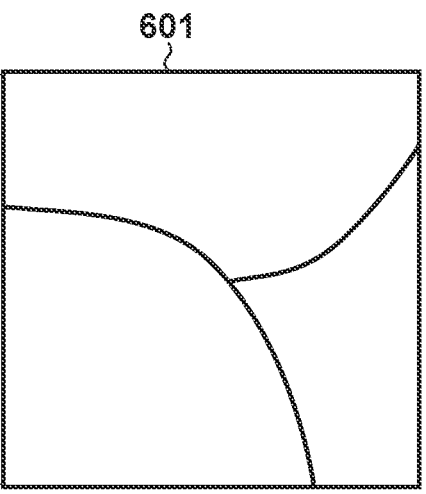
Figure 6C:
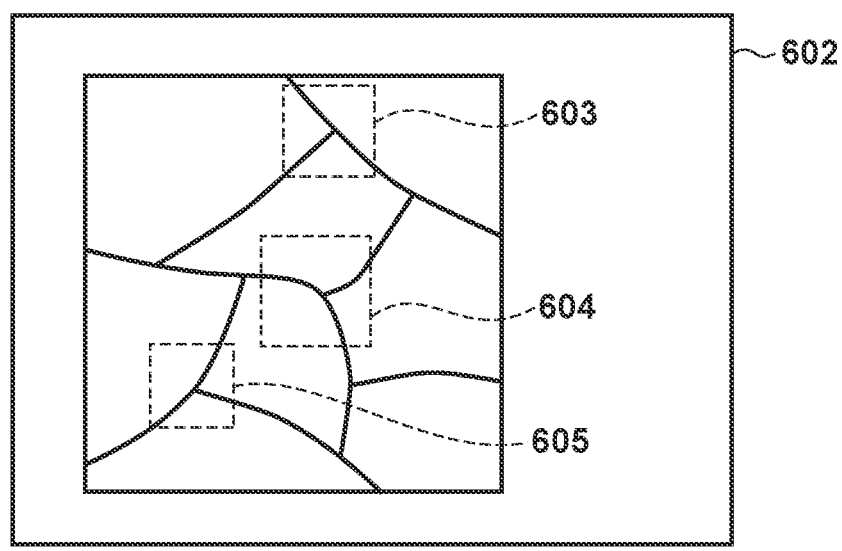

Here, the setting of the region of interest with respect to the supervised data by the setting unit 102 is described with reference to FIG. 6A to FIG. 6C. FIG. 6A shows the entire image region 600 in the image represented by the supervised data included in the basic training data, and contours are extracted in the entire image region in the image. A region of interest 601 is set in the image of FIG. 6A. The region of interest 601 is a region set for obtaining a topological invariant. FIG. 6B is an enlarged view of the region of interest 601 in FIG. 6A.

The settings of the size and shape of the region of interest depend on the characteristics of the input image. For example, in a case where the topological invariant in the region of interest is a very large value, the response when evaluating the topological GT error can become very slow and the effect of using the topological GT error will suffer. Therefore, in such a case, it is necessary so as to reduce the size of the region of interest to some extent, and to reduce the value of the topological invariant to be evaluated by using a preset lower limit value (e.g., 2). Conversely, if the topological invariant evaluated in the region of interest does not significantly change in the range of the set lower limit, the response when evaluating the topological GT error will become very slow, and the effect of using the topological GT error will be lessened. Therefore, in this case, it is necessary to increase the size of the region of interest to some extent, with a preset upper limit value (e.g., 10) as a target, such that the value of the topological invariant to be evaluated does not remain constant in a vicinity of the lower limit value. The size and shape of the region of interest may be set by displaying the entire image region of the image represented by the supervised data on a screen of the display apparatus or the like, and the user can operate a user interface such as a keyboard or mouse while referencing this. FIG. 6C is a diagram showing a state in which an image represented by supervised data is displayed on the display screen of a display apparatus 602, and regions of interest 603 to 605 are set in that image. While checking the image, the user can operate the user interface to set a region of interest for which training is to be mainly performed. Additionally, the method of setting a region of interest on an image represented by the supervised data, and the size, position, and shape of the region of interest are not limited to a specific form.

Figure 7A:
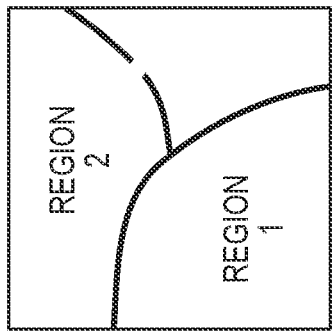
FIG. 7A to FIG. 7F are schematic diagrams of a process for deriving a topological invariant in a region of interest.

Next, the setting unit 102 obtains the topological invariant in the region of interest set on the image represented by the supervised data as the topological GT 508 corresponding to the region of interest. The derivation of the topological invariant (the topological GT 508) of the region of interest by the setting unit 102 is described with reference to FIG. 7A. FIG. 7A shows an example of the region of interest 601 set on an image represented by supervised data, wherein the region of interest 601 includes regions 1 to 3. FIG. 7D is a diagram schematically showing extracted topological geometrical features of the region of interest 601. Corresponding to the region of interest 601 having three regions, there are three holes as shown in FIG. 7D according to the topological geometrical feature of the region of interest 601, so the topological invariant (number of holes) corresponding to the region of interest 601 is three. Therefore, in this case, the setting unit 102 obtains 3 as the topological GT 508 corresponding to the region of interest 601.

Figure 7B:
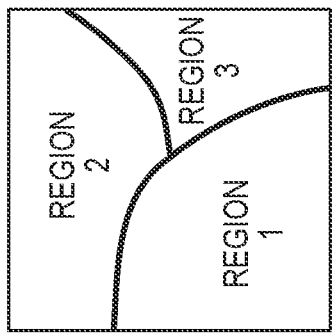

FIG. 7B shows an example of a partial image corresponding to the region of interest 601 in the output data 505, and the partial image includes regions 1 to 3 similarly to the region of interest 601 in FIG. 7A. FIG. 7E is a diagram schematically showing extracted topological geometrical features of the partial image of FIG. 7B. Corresponding to the partial image of FIG. 7B having three regions, there are three holes as shown in FIG. 7E in the topological geometrical feature of this partial image, so the topological invariant 506 corresponding to the partial image of FIG. 7B is three and is the same value as the topological GT 508. In this case, the non-zero topological GT error 510 does not occur in the region of interest 601.

Figure 7C:
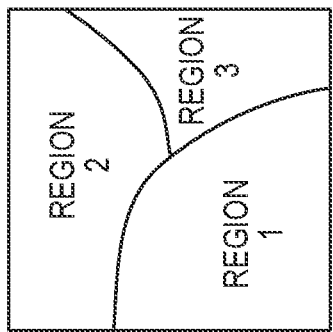
Figure 7D:
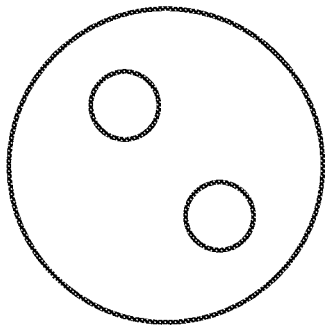
Figure 7E:
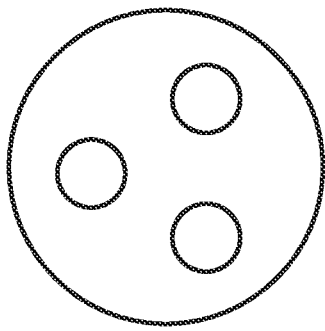
Figure 7F:
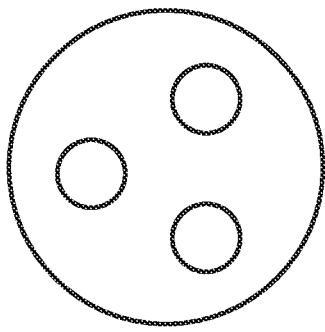

FIG. 7C shows an example of a partial image corresponding to the region of interest 601 in the output data 505, and the partial image includes regions 1 and 2. This region 2 is produced by a break occurring and by the region 2 and the region 3 of FIG. 7A being incorporated. FIG. 7F is a diagram schematically showing extracted topological geometrical features of the partial image of FIG. 7C. Corresponding to the partial image of FIG. 7C having two regions, there are two holes as shown in FIG. 7F in the topological geometrical feature of this partial image, so the topological invariant 506 corresponding to the partial image of FIG. 7C is 2 and is a different value from the topological GT 508. In this case, a non-zero topological GT error 510 occurs in the region of interest 601. In other words, the non-zero topological GT error 510 occurs due to the occurrence of a break in the contour extracted from the partial image, which is taken into consideration as a penalty during training. Additionally, in the above process, a conventional method such as using a persistent diagram may be used to calculate the topological invariant.

Referring back to FIG. 2, in step S104, the control unit 199 determines whether or not the training processing of the hierarchical neural network by the training processing unit 104 is completed. For example, the evaluating unit 107 obtains a false positive rate of the hierarchical neural network by using test data (data for evaluation) stored in the storage unit 106, and in a case where the obtained false positive rate is equal to or less than a threshold, the training process of the hierarchical neural network is determined to be completed. Here, the false positive rate is defined as a ratio of false results obtained from among all of the test data used for evaluation. Additionally, an index for determining whether or not the training process of the hierarchical neural network is completed is not limited to a specific index. For example, when the control unit 199 detects that the user operates the user interface to input an instruction to end the training process, the control unit 199 determines that the training process of the hierarchical neural network is to be completed. For example, the control unit 199 determines that the training process of the hierarchical neural network is completed in a case where the total error 511 is equal to or less than the threshold value or in a case where the number of iterations of the training process is equal to or greater than the threshold value.

As a result of such a decision, in a case where it is determined that the training process of the hierarchical neural network is completed, the processing proceeds to step S105, and in a case where it is determined that the training process of the hierarchical neural network is not completed, the processing proceeds to step S103.

In step S105, the training processing unit 104 stores the result of process of training the hierarchical neural network (weighting coefficients in the hierarchical neural network) in the storage unit 105.

Second Embodiment

In the following embodiments including the present embodiment, differences from the first embodiment will be described, and the embodiments are assumed to be similar to the first embodiment unless otherwise specified. In the present embodiment, when performing retraining of the hierarchical neural network (for example, the hierarchical neural network in which the training process according to the first embodiment is completed) on which training processing has completed, basic training data used for retraining is selected. Then, the hierarchical neural network is retrained using the selected basic training data.

An example of a functional configuration of the information processing apparatus according to the present embodiment will be described with reference to a block diagram of FIG. 8. A storage unit 801 stores the basic training data described in the first embodiment. Note that in the present embodiment, regarding each of the basic training data stored in the storage unit 801, it is assumed that the total error 511 obtained in the first embodiment for the topological invariant training data including the basic training data is stored in the storage unit 105.

A collection unit 802 obtains from the storage unit 801 the total error 511 corresponding to each of the basic training data stored in the storage unit 801. The collection unit 802 collects a predetermined number of basic training data from the storage unit 801 in the order of increasing total error 511 from among each of the basic training data stored in the storage unit 801, and stores the collected basic training data in a storage unit 803.

A training processing unit 804 performs processing for training the hierarchical neural network by using the basic training data stored in the storage unit 803, and stores the result of the training processing in a storage unit 805. A storage unit 806 holds test data used to evaluate the hierarchical neural network on which training by the training processing unit 804 is completed.

An evaluating unit 807 evaluates the hierarchical neural network trained by the training processing unit 804 using the test data stored in the storage unit 806. The evaluating unit 807 notifies the user of the obtained evaluation result by a notification method such as display output or audio output.

A control unit 899 controls operation of each functional unit of the above described information processing apparatus.

Figure 9:
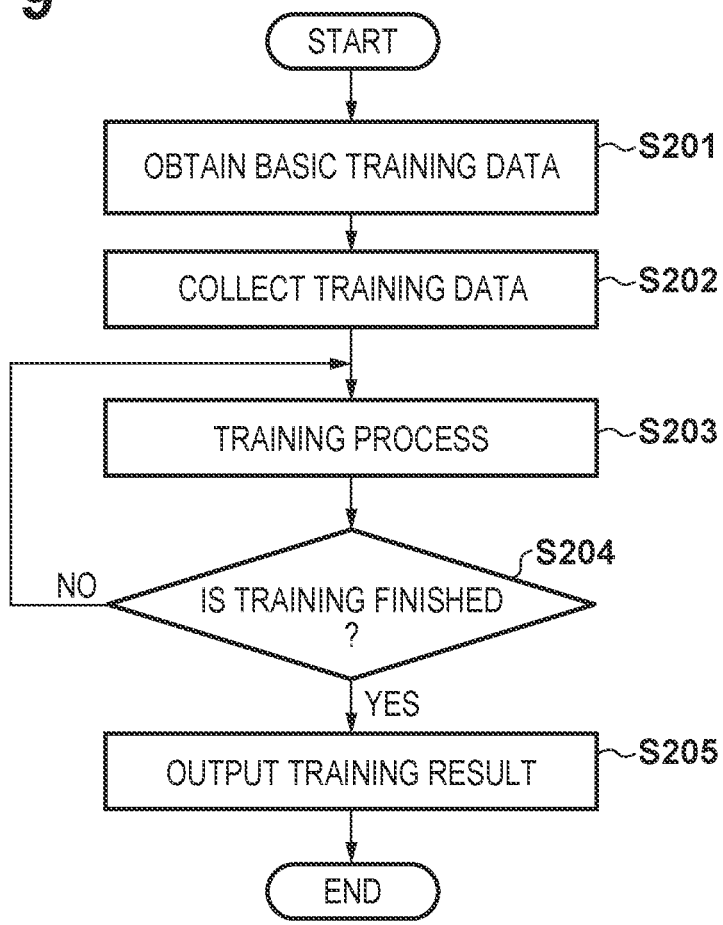
FIG. 9 is a flowchart of the training process for a classifier by the information processing apparatus.

Next, the process of training the classifier by the information processing apparatus according to the present embodiment will be described in accordance with the flowchart of FIG. 9. In step S201, the collection unit 802 obtains all basic training data stored in the storage unit 801.

Figure 10:
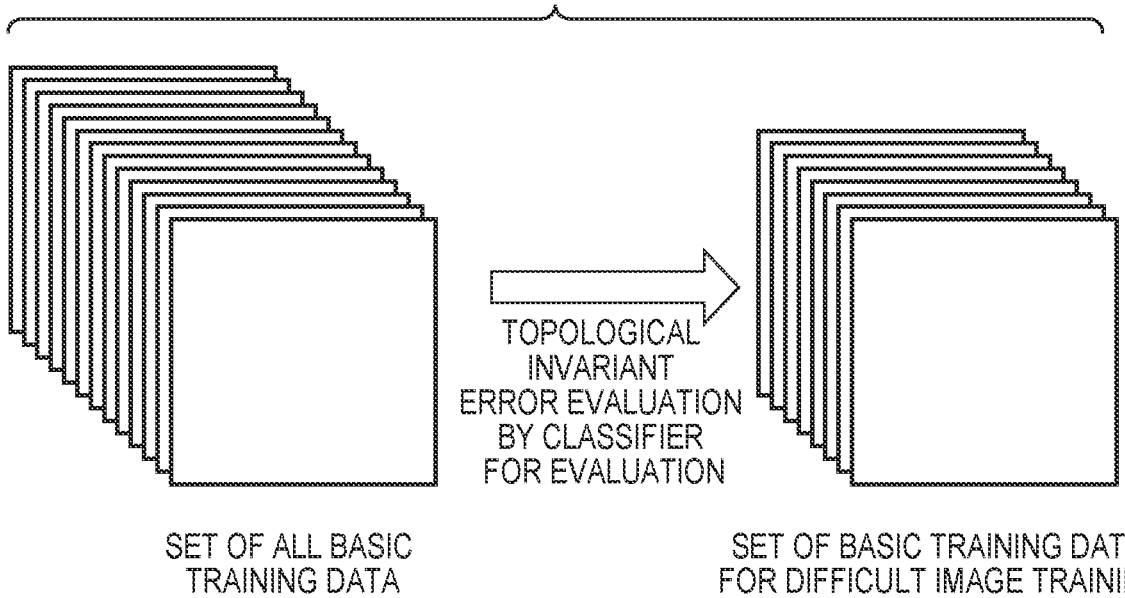
FIG. 10 is a schematic diagram of a process of collecting difficult images using a topological invariant.

In step S202, the collection unit 802 obtains the total error 511 corresponding to each of the basic training data obtained in step S201 from the storage unit 801. Then, the collection unit 802 collects a predetermined number of basic training data in order of increasing total error 511 among each of the basic training data obtained in step S201, and stores the collected basic training data in the storage unit 803. In other words, from among the basic training data groups (a left side of FIG. 10) obtained in step S201, a predetermined number of basic training data groups (a right side of FIG. 10) are collected in order of increasing total error 511 and stored in the storage unit 803. Such processing is, for example, for picking up a difficult-to-train image in order to intensively train the difficult-to-train image. Note that the method of collecting the basic training data by the collection unit 802 is not limited to a specific collecting method. For example, the collection unit 802 displays a list of input data included in the respective basic training data obtained in step S201 on the display screen of the display apparatus. Then, the collection unit 802 collects basic training data including input data selected by the user operating the user interface from the displayed input data.

The topological GT error 510 included in the total error 511 evaluates the accuracy of a somewhat global extraction pattern that is not local. Therefore, by collecting the difficult images in this way and sequentially performing retraining, a hierarchical neural network in which global information is correctly extracted can be finally obtained.

In step S203, the training processing unit 804 performs processing of training the hierarchical neural network using the basic training data collected by the collection unit 802 in step S202. In step S204, the control unit 899 determines whether the processing of training the hierarchical neural network by the training processing unit 804 is completed. For example, the evaluating unit 807 obtains a false positive rate of the hierarchical neural network by using test data (data for evaluation) stored in the storage unit 806, and in a case where the obtained false positive rate is equal to or less than a threshold, the process of training the hierarchical neural network is determined to be completed. Additionally, an index for determining whether or not the process of training the hierarchical neural network is completed is not limited to a specific index similarly to the first embodiment.

As a result of such a decision, in a case where is determined that the process of training the hierarchical neural network is completed, the processing proceeds to step S205, and in a case where it is determined that the process of training the hierarchical neural network is not completed, the processing returns to step S203.

In step S205, the training processing unit 804 stores the result of the processing of training the hierarchical neural network (weighting coefficients in the hierarchical neural network) in the storage unit 805.

Third Embodiment

In the present embodiment, a description will be given of a case where the information processing apparatus according to the first embodiment is applied to the problem of contour extraction in an input image to perform training of a hierarchical neural network.

Figure 11A:
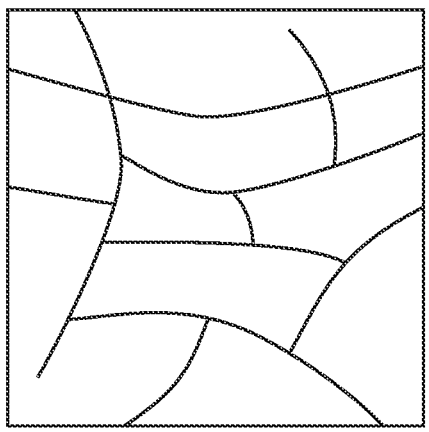
FIG. 11A to FIG. 11D are schematic diagrams of the training process according to a third embodiment.
Figure 11B:
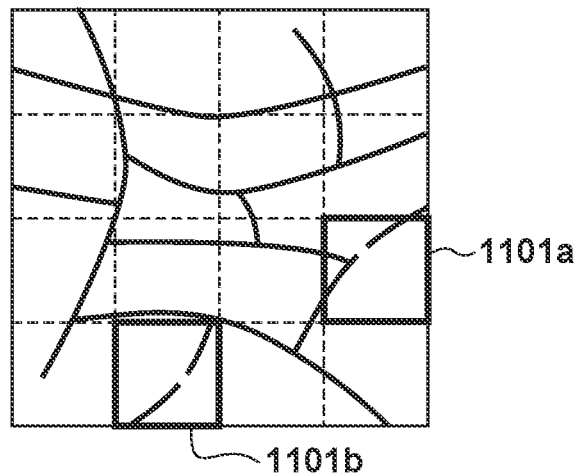
Figure 11C:
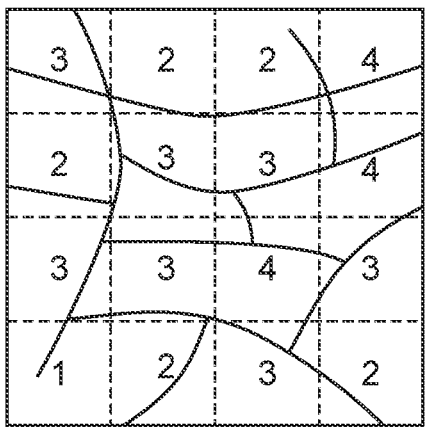
Figure 11D:
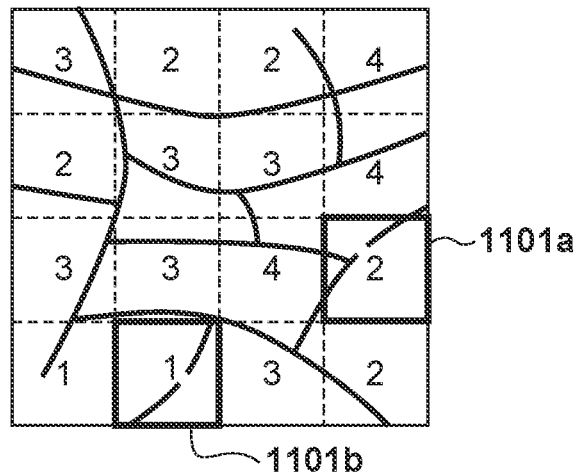

FIG. 11A is a diagram illustrating supervised data of contours extracted in an image. FIG. 11B is a diagram illustrating a result of extracting contours obtained by applying a hierarchical neural network during training to the same image as that in FIG. 11A. In FIGS. 11B to 11D, a region defined by broken lines indicates a region of interest when evaluating a topological GT error. As shown in FIG. 11B, in regions of interest 1101a and 1101b, a break of the extracted contours occurred.

FIG. 11C is a diagram illustrating topological invariants (the number of regions into which the contours divide the region of interest) corresponding to each region of interest defined by broken lines in the same image as FIG. 11A. FIG. 11D is a diagram illustrating a topological invariant (number) in each region of interest shown in FIG. 11B. As shown in FIG. 11D, in each of the regions of interest 1101a and 1101b, the topological invariant amounts are "2" and "1", among the topological invariant amounts "1," "2,", "3," and "4," respectively corresponding to the occurrence of a break in the extracted contours, and are different from the topological invariant amounts "3" and "2" in the corresponding regions of interest in FIG. 11C. That is, non-zero topological GT errors occur in the regions of interest 1101a and 1101b. As described above, for a region in which a non-zero topological GT error occurs due to a break in the contour, an error is evaluated to be larger and the contribution to the training is increased, giving it more weight. As a result, as training progresses, a hierarchical neural network in which such a break of the contour does not occur can be generated. Note that, in the above-described case, the region of interest is set so as not to cause overlapping or blank space, but the region of interest may be set so as to cause overlapping or blank space so that the topological invariant is evaluated more desirably.

Fourth Embodiment

In this embodiment, a case will be described in which the information processing apparatus according to the first embodiment is applied to the problem of region division in an input image to perform training of a hierarchical neural network.

Figure 12A:
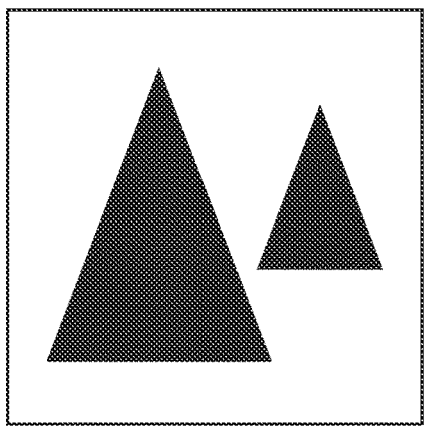
FIG. 12A to FIG. 12D are schematic diagrams of the training process according to a fourth embodiment.
Figure 12B:
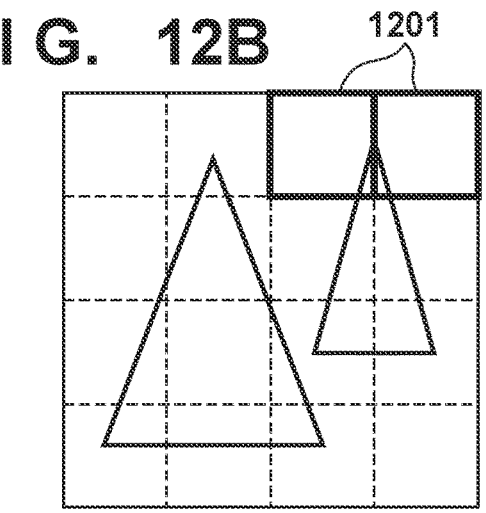
Figure 12C:
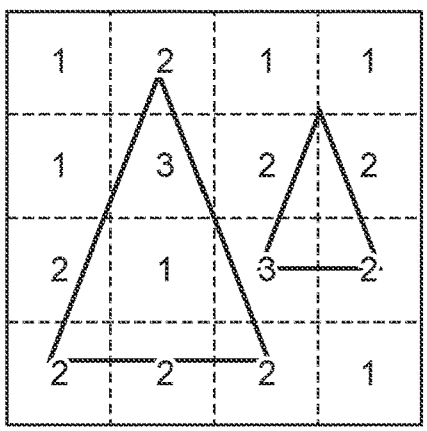
Figure 12D:
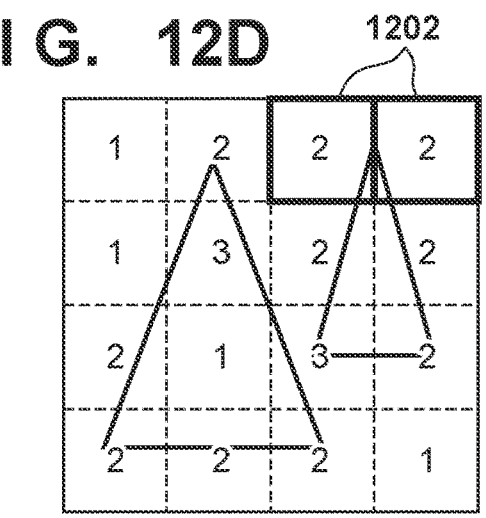

FIG. 12A is a diagram illustrating supervised data for each region of interest of an image to be divided into regions. FIG. 12B is a diagram illustrating a result, obtained by applying a hierarchical neural network during training, of dividing the same image as that in FIG. 12A into regions. In FIGS. 12B to 12D, a region defined by broken lines indicates a region of interest when evaluating a topological GT error. As shown in FIG. 12B, in a region of interest 1201, a positional deviation from the supervised data occurs with respect to the boundary divided into regions.

FIG. 12C is a diagram showing the topological invariants (numbers) corresponding to the regions of interest defined by broken lines in the same image as FIG. 12A. FIG. 12D is a diagram showing a topological invariant (number) corresponding to each region of interest defined by the broken lines in the same image as FIG. 12B. As shown in FIG. 12D, in a region of interest 1202, the topological invariant is "2" when there is a positional deviation of the boundary dividing the regions, and this is a value different from the topological invariant "1" in the region of interest corresponding to the region of interest 1202 in FIG. 12C. That is, a non-zero topological GT error occurs in the region of interest 1202. In this way, for a region in which there is a positional deviation of the boundary dividing the regions and a non-zero topological GT error occurs, an error is evaluated to be large and the contribution to the training is increased, giving it more weight. As a result, as training progresses, a hierarchical neural network in which such a positional deviation of a boundary does not occur can be generated. Note that, in the above-described case, the region of interest is set so as not to cause overlapping or blank space, but the region of interest may be set so as to cause overlapping or blank space so that the topological invariant is evaluated more desirably.

Fifth Embodiment

Figure 13:
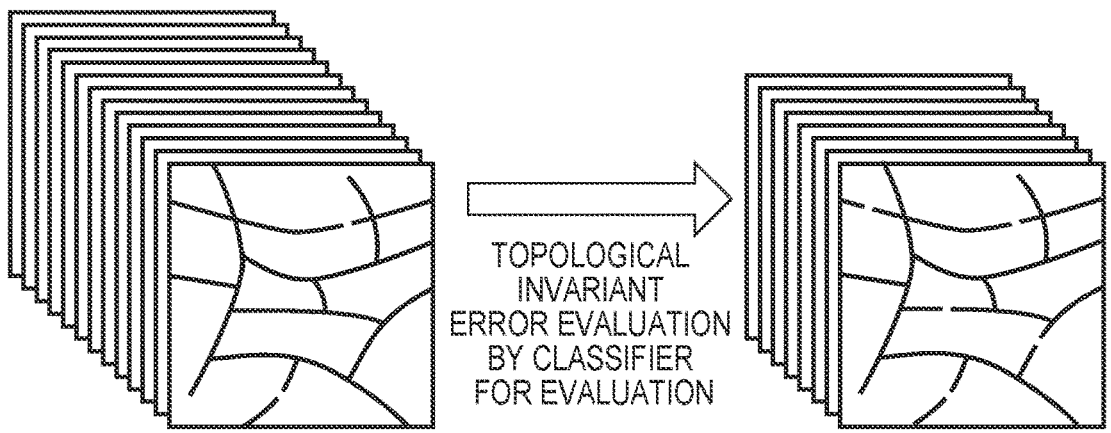
FIG. 13 is a schematic diagram of the training process according to a fifth embodiment.

According to the fifth embodiment, as shown in FIGS. 13A and 13B, in the case of application to the problem of contour extraction, a set of basic training data (a right side of FIG. 13) in which there are more breaks than the set of a left side of FIG. 13 is preferentially selected from the set of basic training data (the left side of FIG. 13). As described above, in the problem of contour extraction, it is possible to finally obtain a hierarchical neural network, in which contour breaks are unlikely to occur and global contours are correctly extracted, by collecting difficult images in which there are many places of breaks and sequentially performing retraining.

Note, in each of the above embodiments, description is given using a hierarchical neural network as an example of a classifier, but the present invention is not limited to this, and a classifier other than the hierarchical neural network may be applied.

The information processing apparatus according to each of the above embodiments may be implemented by a single apparatus or by a plurality of apparatuses. The information processing apparatus according to each of the above embodiments may be an embedded device incorporated in an apparatus such as a digital camera or a multifunction peripheral.

Sixth Embodiment

Figure 8:
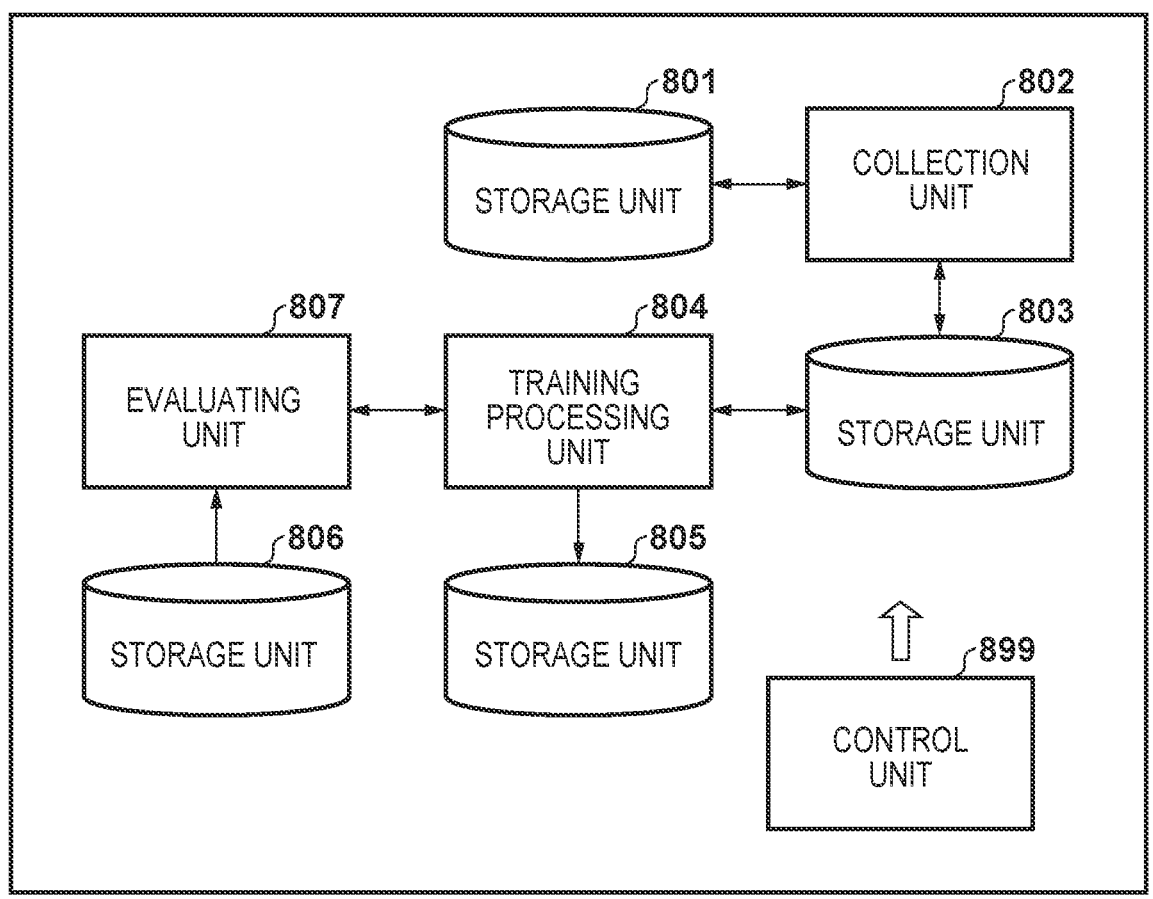
FIG. 8 is a block diagram that illustrates an example of a functional configuration of the information processing apparatus.

All the functional units of the information processing apparatus shown in FIGS. 1 and 8 may be implemented by hardware, or the functional units other than the storage units 101, 103, 105, 106, 801, 803, 805, and 806 may be implemented by software (computer program). In this case, the computer apparatus capable of executing the computer program is applicable to the information processing apparatus according to each of the above embodiments. An example of a hardware configuration of a computer apparatus applicable to each of the above embodiments will be described with reference to a block diagram of FIG. 14.

A CPU 1401 executes various processes using computer programs and data stored in a RAM 1402 and a ROM 1403. Thus, the CPU 1401 controls the overall operation of the computer apparatus, and executes or controls the above-described processes performed by the information processing apparatus.

The RAM 1402 has an area for storing computer programs and data loaded from the ROM 1403 or an external storage apparatus 1406, and an area for storing data received from the outside via an I/F (interface) 1407. Furthermore, the RAM 1402 has a work area used when the CPU 1401 executes various processes. Thus, the RAM 1402 can appropriately provide various areas. The ROM 1403 stores setting data of the computer apparatus, a boot program, and the like.

An operating unit 1404 is a user interface such as a keyboard, a mouse, and a touch panel screen. The user can input various instructions to the CPU 1401 by operating the operating unit 1404.

A display unit 1405 has a liquid crystal screen and a touch panel screen, and can display processing results by the CPU 1401 in the form of images, characters, or the like. Note, the display unit 1405 may be a projection device such as a projector that projects images and characters.

For example, the display unit 1405 may display an evaluation result by the evaluating unit 107, may display a screen for setting a region of interest, or may display a screen for selecting basic training data. Alternatively, for example, a user interface may be used to perform an operation of setting a region of interest or an operation of selecting basic training data by a user. The user may operate the user interface to input an instruction to complete the training process.

The external storage apparatus 1406 is an example of a mass information storage device. The external storage apparatus 1406 stores, for example, an OS (operating system) and computer programs or data for causing the CPU 1401 to execute or control the above-described processes performed by the information processing apparatus. The computer program stored in the external storage apparatus 1406 includes a computer program for causing the CPU 1401 to execute/control a function corresponding to each functional unit other than the storage units 101, 103, 105, 106, 801, 803, 805, and 806. The data described as the known information in the above description is included in the data stored in the external storage apparatus 1406.

The computer program and data stored in the external storage apparatus 1406 are loaded into the RAM 1402 as appropriate according to the control of the CPU 1401, and are processed by the CPU 1401.

Note, the above-described storage units 101, 103, 105, 106, 801, 803, 805, and 806 can be implemented using a memory device such as the RAM 1402, the ROM 1403, and the external storage apparatus 1406.

An I/F 1407 functions as an interface for performing data communication with an external apparatus, and data received from the external apparatus via the I/F 1407 is stored in the RAM 1402 or the external storage apparatus 1406.

Figure 14:
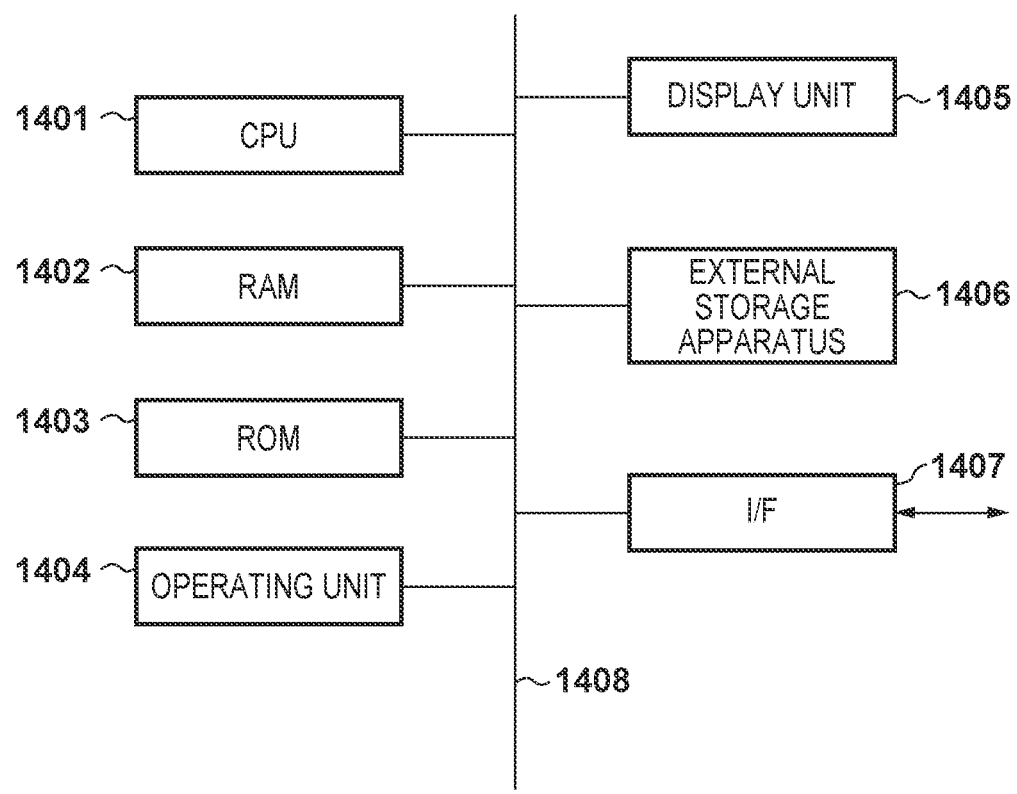
FIG. 14 is a block diagram that illustrates an example of a hardware configuration of a computer apparatus.

The CPU 1401, the RAM 1402, the ROM 1403, the operating unit 1404, the display unit 1405, the external storage apparatus 1406, and the I/F 1407 are all connected to a bus 1408. Note, the configuration shown in FIG. 14 is merely an example of a hardware configuration of a computer apparatus applicable to the above-described information processing apparatus, and can be changed as appropriate.

Note, the specific numerical values used in the above description are used for carrying out the specific description, and the above embodiments are not intended to be limited to these numerical values. Some or all of the embodiments described above may be combined as appropriate. In addition, some or all of the above-described embodiments may selectively be used.

Other Embodiments

Embodiment(s) of the present invention can also be realized by a computer of a system or apparatus that reads out and executes computer executable instructions (e.g., one or more programs) recorded on a storage medium (which may also be referred to more fully as a anon-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-149156, filed Aug. 15, 2019, which is hereby incorporated by reference herein in its entirety.

What is claimed is:

1. An information processing apparatus comprising:
a memory storing instructions; and
a processor that executes the instructions to:
obtain an output image output from a classifier that receives input data;
calculate a first error between the output image and a supervised image corresponding to the input data;
set a region of interest in the supervised image for calculating a topological invariant, which is a property that is kept unchanged even if an original shape is continuously transformed;
calculate a first topological invariant of the region of interest in the supervised image;
calculate a second topological invariant of a correspondence region in the output image corresponding to the region of interest;
calculate a second error between the first topological invariant and the second topological invariant;
calculate a total error from the first error and the second error; and
train the classifier to minimize the total error.

2. The information processing apparatus according to claim 1, wherein the processor, in setting the region of interest, sets a size and a shape of the region of interest based on the first topological invariant.

3. The information processing apparatus according to claim 1, wherein:
the processor executes instructions to display the supervised image on a display, and
the processor, in setting the region of interest, sets a size and a shape of the region of interest based on an input by a user in relation to the displayed supervised image.

4. The information processing apparatus according to claim 1, the processor executes the instructions to:
obtain training data to be used in retraining of the classifier from a set of training data including the input data and the supervised image; and
retrain the classifier using the obtained training data.

5. The information processing apparatus according to claim 4, wherein the processor obtains the training data to be used in the retraining of the classifier from the set based on a result of the training of the classifier.

6. The information processing apparatus according to claim 5, wherein the processor, in obtaining the training data, selects from the set, as the training data to be used in the retraining of the classifier, a predetermined number of training data in order of increasing error in the result of the training of the classifier.

7. The information processing apparatus according to claim 5, wherein the processor, in obtaining the training data, displays the set in a list and obtains selected training data selected by a user from the set displayed in the list as the training data to be used in the retraining of the classifier.

8. The information processing apparatus according to claim 1, wherein the processor calculates the second error based on a cross entropy where the first and second topological invariants each are a label value.

9. The information processing apparatus according to claim 1, wherein the classifier is a hierarchical neural network.

10. The information processing apparatus according to claim 1, wherein:
the first topological invariant is a number of holes that exists in a contour of the region of interest in the supervised image, and
the second topological invariant is a number of holes that exists in a contour of the correspondence region in the output image.

11. An information processing method, the method comprising:
obtaining an output image output from a classifier that receives input data;
calculating a first error between the output image and a supervised image corresponding to the input data;
setting a region of interest in the supervised image for calculating a topological invariant, which is a property that is kept unchanged even if an original shape is continuously transformed;
calculating a first topological invariant of the region of interest in the supervised imago;
calculating a second topological invariant of a correspondence region in the output image corresponding to the region of interest;
calculating a second error between the first topological invariant and the second topological invariant;
calculating a total error from the first error and the second error; and
training the classifier to minimize the total error.

12. A non-transitory computer-readable storage medium storing a computer program executable by a computer to execute a method comprising:
obtaining an output image output from a classifier that receives input data;
calculating a first error between the output image and a supervised image corresponding to the input data;
setting a region of interest in the supervised image for calculating a topological invariant, which is a property that is kept unchanged even if an original shape is continuously transformed;

calculating a first topological invariant of the region of interest in the supervised image;

calculating a second topological invariant of a correspondence region in the output image corresponding to the region of interest;

calculating a second error between the first topological invariant and the second topological invariant;

calculating a total error from the first error and the second error; and training the classifier to minimize the total error.

* * * * *